United States Patent
Chatelain et al.

(10) Patent No.: US 10,051,480 B2
(45) Date of Patent: *Aug. 14, 2018

(54) VISUAL REPRESENTATION OF SIGNAL STRENGTH USING MACHINE LEARNING MODELS

(71) Applicant: International Business Machines Corporation, Armonk, NY (US)

(72) Inventors: Edward L. Chatelain, Cary, NC (US); Jeremy A. Greenberger, Raleigh, NC (US); Nicholas R. Sandonato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/917,950

(22) Filed: Mar. 12, 2018

(65) Prior Publication Data
US 2018/0176795 A1    Jun. 21, 2018

Related U.S. Application Data

(63) Continuation of application No. 15/678,588, filed on Aug. 16, 2017, now Pat. No. 9,949,140, which is a
(Continued)

(51) Int. Cl.
*H04W 16/18* (2009.01)
*H04L 12/26* (2006.01)
(Continued)

(52) U.S. Cl.
CPC .......... *H04W 16/18* (2013.01); *H04B 17/318* (2015.01); *H04B 17/373* (2015.01);
(Continued)

(58) Field of Classification Search
CPC ..... H04W 84/12; H04W 88/02; H04W 16/18; H04W 24/02; H04W 72/085; H04W 88/08; H04L 41/12; H04L 43/045; H04B 17/318
See application file for complete search history.

(56) References Cited

U.S. PATENT DOCUMENTS

| 7,246,045 B1 | 7/2007 | Rappaport et al. |
| 8,040,219 B2 | 10/2011 | Haartsen et al. |

(Continued)

FOREIGN PATENT DOCUMENTS

| WO | 2013052653 A1 | 4/2013 |
| WO | 2014059374 A1 | 4/2014 |

(Continued)

OTHER PUBLICATIONS

Shin et al., "Wi-Fi Fingerprint-Based Topological Map Building for Indoor User Tracking", The Sixteenth IEEE International Conference on Embedded and Real-Time Computing Systems and Applications, IEEE Computer Society, © 2010, DOI 10.1109/RTCSA.2010.23, pp. 105-113.

(Continued)

*Primary Examiner* — Nam Huynh
(74) *Attorney, Agent, or Firm* — Alexander G. Jochym (57) ABSTRACT

Information about a signal device is received at a first location in a first physical environment. The signal device broadcasts a signal to a computing device. A first indication is received from the computing device. The first indication includes a first strength of signal of the signal device received by the computing device. Whether the first strength of signal is above a threshold is determined. A second location is determined. The second location is where the computing device is located when the first strength of signal is above the threshold. The second location is within the first physical environment. A first visual representation of the first physical environment is displayed. The first visual representation includes one or more of the following: the signal device at the first location, at least one physical item found in the physical environment, a broadcasting power of the signal device, and the second location.

1 Claim, 4 Drawing Sheets

Related U.S. Application Data continuation of application No. 15/079,502, filed on Mar. 24, 2016, now Pat. No. 9,949,135.

(51) Int. Cl.
  *H04B 17/318* (2015.01)
  *H04B 17/391* (2015.01)
  *H04L 12/24* (2006.01)
  *H04B 17/373* (2015.01)
  *H04B 17/27* (2015.01)
  *H04B 17/23* (2015.01)

(52) U.S. Cl.
  CPC ....... *H04B 17/3913* (2015.01); *H04L 41/145* (2013.01); *H04L 41/16* (2013.01); *H04L 43/045* (2013.01); *H04L 43/16* (2013.01); *H04B 17/23* (2015.01); *H04B 17/27* (2015.01)

(56) References Cited

U.S. PATENT DOCUMENTS

| | | | |
|---|---|---|---|
| 8,442,552 | B2 | 5/2013 | Gallegos |
| 9,544,738 | B1 | 1/2017 | Barlett |
| 2010/0109864 | A1 | 5/2010 | Haartsen et al. |
| 2011/0243020 | A1 | 10/2011 | Ponnuswamy |
| 2013/0258881 | A1 | 10/2013 | Li |
| 2014/0329537 | A1 | 11/2014 | Huang |
| 2017/0064577 | A1 | 3/2017 | Liu |

FOREIGN PATENT DOCUMENTS

| | | | |
|---|---|---|---|
| WO | 2014078155 | A1 | 5/2014 |
| WO | 2015051104 | A1 | 4/2015 |

OTHER PUBLICATIONS

"Aislelabs Navigate—Aislelabs", © 2016 Aislelabs. End-to-End Location Platform for Enterprises, Last printed Jan. 25, 2016, 6 pages, <http://www.aislelabs.com/products/navigate>.

"Database Tools and Developer Software | Embarcadero Technologies", © Copyright 2015 Embarcadero Technologies, Inc. All Rights Reserved, Last printed Jan. 25, 2016, 5 pages, <http://www.embarcadero.com/>.

Chatelain et al., "Visual Representation of Signal Strength Using Machine Learning Models", U.S. Appl. No. 15/079,502, filed Mar. 24, 2016, 32 pages.

Appendix P—List of IBM Patents or Patent Applications Treated as Related, Filed Herewith, 2 Pages.

Chatelain et al., "Visual Representation of Signal Strength Using Machine Learning Models", U.S. Appl. No. 15/678,588, filed Aug. 16, 2017, 32 pages.

Chatelain et al., "Visual Representation of Signal Strength Using Machine Learning Models", U.S. Appl. No. 15/917,932, filed Mar. 12, 2018, 32 pages.

VISUAL REPRESENTATION OF SIGNAL STRENGTH USING MACHINE LEARNING MODELS

BACKGROUND

The present invention relates generally to the field of machine learning models, and more particularly to making predictions using machine learning models.

In computing, machine learning is a subfield of computer science that evolved from the study of pattern recognition and computational learning theory in artificial intelligence. Machine learning explores the study and construction of algorithms that can learn from and make prediction of data. Such algorithms operate by building a model from example inputs in order to make data-driven predictions or decisions.

SUMMARY OF THE INVENTION

Embodiments of the present invention include a method, computer program product, and system for determining, modeling, and displaying signal strength in a physical environment. In one embodiment, information about a signal device is received at a first location in a first physical environment. The signal device broadcasts a signal to a computing device. A first indication is received from the computing device. The first indication includes a first strength of signal of the signal device received by the computing device. Responsive to receiving the first indication from the computing device, whether the first strength of signal is above a threshold is determined. Responsive to determining the first strength of signal is above the threshold, a second location is determined. The second location is where the computing device is located when the first strength of signal is above the threshold. The second location is within the first physical environment. A first visual representation of the first physical environment is displayed. The first visual representation includes one or more of the following: the signal device at the first location, at least one physical item found in the physical environment, a broadcasting power of the signal device, and the second location.

DETAILED DESCRIPTION

Embodiments of the present invention provide for determining an area and determining the signal devices and physical items found in the area. Embodiments of the present invention provide for determining signal strength of devices in the area. Embodiments of the present invention provide for creating a machine learning model for different signal devices and characteristics of an area using the determined signal strength of devices in the area. Embodiments of the present invention provide for creating visual representations of signal strength of signal devices found in area using the created machine learning models for the signal devices and the characteristics found in the area.

Embodiments of the present invention recognize that Bluetooth™ and wireless fidelity (Wi-Fi) devices (i.e., signal devices) are the most popular means of providing enhanced experiences for customers of venues, such as stadiums, airports, retail stores and hospitals. Embodiments of the present invention recognize that these devices have a disadvantage when it comes to ranging the transmission of the signal of the signal device. Embodiments of the present invention recognize that these devices often have different ranges for the transmission of the signal than characterized by the specifications of the signal device.

The present invention will now be described in detail with reference to the Figures.

Figure 1:
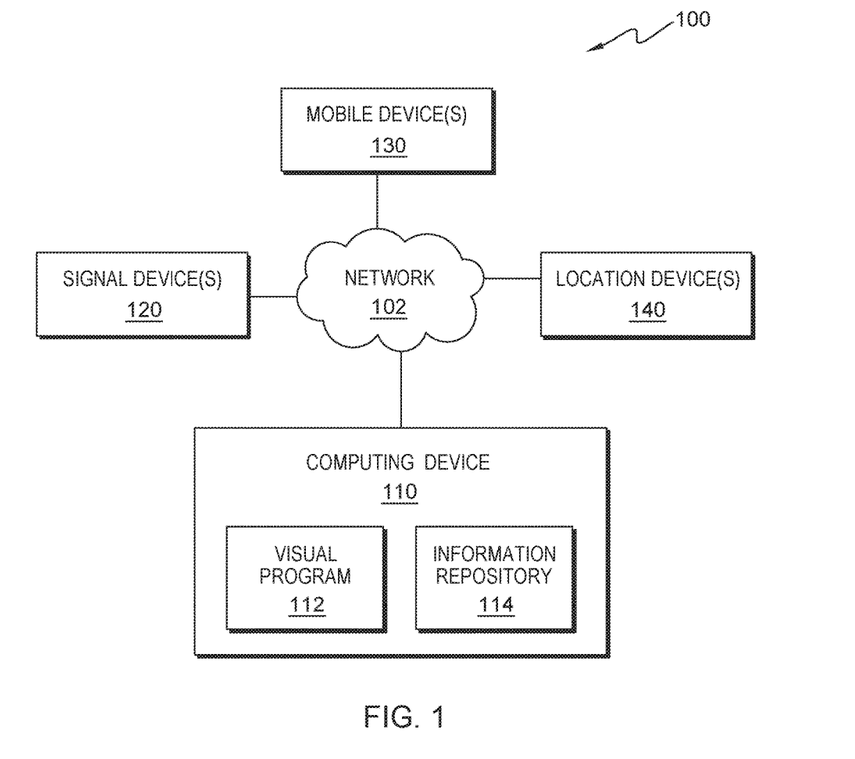
FIG. 1 depicts a functional block diagram of a data processing environment, in accordance with an embodiment of the present invention.

FIG. 1 is a functional block diagram illustrating a data processing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

An embodiment of data processing environment 100 includes computing device 110, signal device(s) 120, mobile device(s) 130, and location device(s) 140, interconnected over network 102. Network 102 can be, for example, a local area network (LAN), a telecommunications network, a wide area network (WAN) such as the Internet, or any combination of the three, and include wired, wireless, or fiber optic connections. In general, network 102 can be any combination of connections and protocols that will support communications between computing device 110, signal device(s), mobile devices(s), location devices(s), and any other computer connected to network 102, in accordance with embodiments of the present invention. In an embodiment, data collected and/or analyzed by any of signal device(s) 120, mobile device(s) 130, and location device(s) 140 may be received by another computing device (not shown) and communicated to computing device 110 via network 102.

In an embodiment, computing device 110 may be a laptop, tablet, or netbook personal computer (PC), a desktop computer, a personal digital assistant (PDA), a smart phone, camera, video camera, video device or any programmable electronic device capable of communicating with any computing device within data processing environment 100. In certain embodiments, computing device 110 collectively represents a computer system utilizing clustered computers and components (e.g., database server computers, application server computers, etc.) that act as a single pool of seamless resources when accessed by elements of data processing environment 100, such as in a cloud computing environment. In general, computing device 110 is representative of any electronic device or combination of electronic devices capable of executing computer readable program instructions. In an embodiment, computing device 110 may include components as depicted and described in detail with respect to FIG. 5, in accordance with embodiments of the present invention.

In an embodiment, computing device 110 includes visual program 112 and information repository 114. In an embodiment, visual program 112 is a program, application, or subprogram of a larger program for the determining, modeling, and displaying of signal strength in a physical environment. In an embodiment, a physical environment is any physical area (e.g., a home, a condo, a store, an office, etc.) In an alternative embodiment, visual program 112 may be located on any other device accessible by computing device 110 via network 102. In an embodiment, information repository 114 may include a single machine learning model or multiple machine learning models. In an embodiment, each machine learning model may be associated with a signal device(s) or a physical item(s) that may be located in physical environments. In an embodiment, the machine learning model is a model of the relationship between signal strength of signal device(s) 120 and the battery power of the signal device(s) 120, the type of signal device(s) 120, etc. In an embodiment, visual program 112 determines the type of signal device(s) 120, and determines the battery level of the signal device(s) 120 when mobile device(s) 130 has a signal strength from signal device(s) 120 above a threshold and signal strength is mapped for the location of the mobile device(s) 130 relative to the signal device(s) 120. In an embodiment, the machine learning model is a model of the relationship between signal strength of signal device(s) 120 and the physical items found in an area and the effects the physical items have on the signal strength of the signal device(s) 120. In an embodiment, visual program 112 determines physical items found in an area and determines the battery level of the signal device(s) 120 when mobile device(s) 130 have a signal strength from signal device(s) 120 above a threshold. In an embodiment, the signal strength is mapped for the location of the mobile device(s) 130 relative to the signal device(s) 120 and visual program 112 takes into account the physical items found in the physical area to map the effects the physical items have on the signal strength of the signal device(s) 120. In an alternative embodiment, information repository 114 may be located on any other device accessible by computing device 110 via network 102.

In an embodiment, visual program 112 may determine and model signal strength in a physical environment. In an embodiment, visual program 112 may determine a physical area (i.e. physical environment). In an embodiment, visual program 112 may receive data from mobile device(s) 130 and the data may include information about the signal strength found on the mobile device(s) 130 for the connection between the mobile device(s) 130 and a signal device(s) 120. In an embodiment, visual program 112 determines if the signal strength is above a threshold. In an embodiment, visual program 112 receives the location of the mobile device(s) 130 from the location device(s) 140 if the signal strength is above a threshold. In an embodiment, visual program 112 may receive mobile device data even if the signal strength is below the threshold. In an embodiment, visual program 112 creates a machine learning model using the data received (i.e., location data of the mobile device(s) 130 when the signal strength is above a threshold) and any other data previously received related (i.e., location data of the mobile device(s) 130 when the signal strength is above a threshold received previously).

In an embodiment, visual program 112 may display signal strength in a physical environment. In an embodiment, visual program 112 may determine a physical area(s). In an embodiment, visual program 112 may determine any number of signal device(s) 120 to be deployed (i.e. physically placed) in the determined physical area(s). In an embodiment, visual program 112 may determine any number of model(s) based on the determined signal device(s) and the determined physical area(s). In an embodiment, visual program 112 may create a visual representation of the physical area(s) that includes the modeled signal strength of the signal device(s) in the physical area.

A machine learning model includes the construction and implementation of algorithms that can learn from and make predictions on data. The algorithms operate by building a model from example inputs in order to make data-driven predictions or decisions, rather than following strictly static program instructions. In an embodiment, the model is a system, which explains the behavior of some system, generally at the level where some alteration of the model predicts some alteration of the real-world system. In an embodiment, a machine learning model may be used in a case where the data becomes available in a sequential fashion, in order to determine a mapping from the dataset to corresponding labels. In an embodiment, the goal of the machine learning model is to minimize some performance criteria using a loss function. In an embodiment, the goal of the machine learning model is to minimize the number of mistakes when dealing with classification problems. In yet another embodiment, the machine learning model may be any other model known in the art. In an embodiment, the machine learning model may be a SVM "Support Vector Machine." In an alternative embodiment, the machine learning model may be any supervised learning regression algorithm. In yet another embodiment, the machine learning model may be a neural network.

In an embodiment, there may be a machine learning model created for each type of signal device(s) 120. In an embodiment, there may be a machine learning model created for each type of physical items found in an area and the effect the physical items have on signal strength. In an embodiment, the machine learning model is a model of the relationship between signal strength of signal device(s) 120 and the battery power of the signal device(s) 120, the type of signal device(s) 120, etc. In an embodiment, visual program 112 determines the type of signal device(s) 120, and determines the battery level of the signal device(s) 120 when mobile device(s) 130 have a signal strength from signal device(s) 120 above a threshold and signal strength is mapped for the location of the mobile device(s) 130 relative to the signal device(s) 120. In an embodiment, the machine learning model is a model of the relationship between signal strength of signal device(s) 120 and the physical items found in an area and the effects the physical items have on the signal strength of the signal device(s) 120. In an embodiment, visual program 112 determines physical items found in the physical area. In an embodiment, visual program determines the battery level of the signal device(s) 120 when mobile device(s) 130 have a signal strength from signal device(s) 120 above a threshold. In an embodiment, visual program 112 maps the signal strength for the location of the mobile device(s) 130 relative to the signal device(s) 120 and visual program 112 takes into account the physical items found in the physical area to map the effects the physical items have on the signal strength of the signal device(s) 120. In an embodiment, the output for the created machine learning model(s) are modified signal strength(s) as shown in a physical area.

Figure 4A:
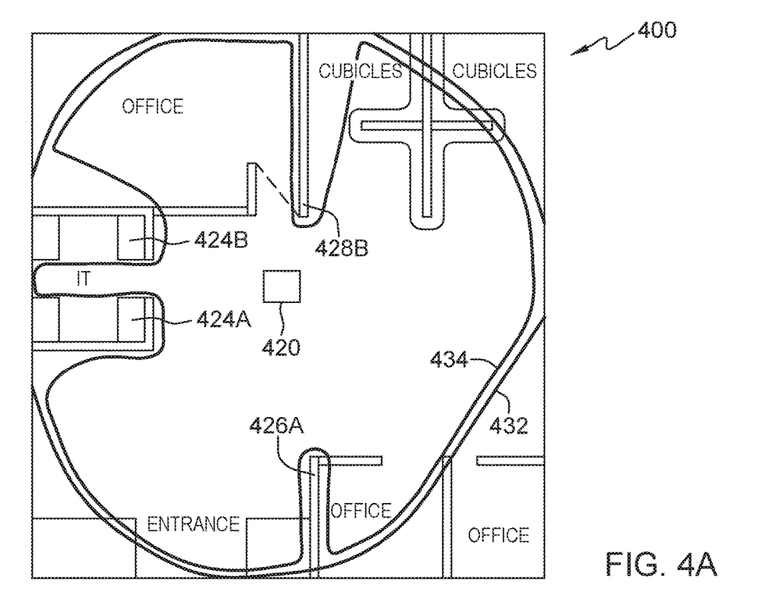
FIGS. 4A and 4B depict example visual representations of signal strength in a physical environment, in accordance with an embodiment of the present invention.
Figure 4B:
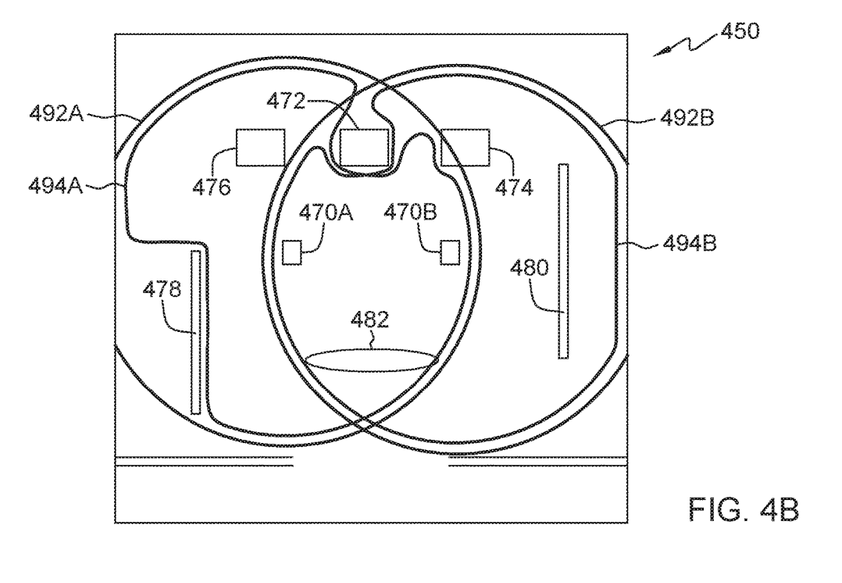

In an embodiment, visual program 112 may include a user interface that allows a user to interact with visual program 112. A user interface (not shown) is a program that provides an interface between a user and visual program 112. A user interface refers to the information (such as graphic, text, and sound) a program presents to a user and the control sequences the user employs to control the program. There are many types of user interfaces. In one embodiment, the user interface can be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements. An example UI is shown in FIG. 4A and FIG. 4B, discussed later.

In an embodiment, computing device 110 includes information repository 114. In an embodiment, information repository 114 may be managed by visual program 112. In an alternative embodiment, information repository 114 may be managed by the operating system of computing device 110, alone, or together with, visual program 112. In an embodiment, information repository 114 may include information about physical area(s) (e.g., floor plans, etc.). In an embodiment, information repository 114 may include information about thresholds. In an embodiment, information repository 114 may include information for one or more machine learning models related to physical item(s) (e.g., walls, beams, electronic devices, etc.) that may be found in a physical area(s) and the effect the physical item(s) have on signal strength of signal device(s) 120. In an embodiment, information repository 114 may include information for one or more machine learning models related to signal device(s) 120 including, but not limited to, signal strength, battery power, type of signal device, location of the signal device, etc.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

In an embodiment, signal device(s) 120 may be one or more device(s) that allows for wireless communication with another computing device. In an embodiment, signal device(s) may be any networking device that forwards data packets between computing devices. In an embodiment, signal device(s) may be any networking device that is part of a wireless personal area network. In certain embodiments, signal device(s) 120 may be a local area wireless computing device (i.e., Wi-Fi) that allows computing devices to connect (e.g., via 2.4 gigahertz and/or 5 gigahertz radio bands) to a network (e.g., network 102) or other computing devices (e.g., mobile device(s) 130). In certain embodiments, signal device(s) 120 may be a device capable of Bluetooth™ communication that allows computing devices (e.g., mobile device(s) 13) to connect. In certain embodiment, signal device(s) 120 may be include the ability for radio-frequency identification (RFID). In an embodiment, signal device(s) may be a combination of any of the above-referenced technology (e.g., two Wi-Fi devices and a Bluetooth™ device, a Wi-Fi device and two Bluetooth™ devices, etc.) In an embodiment, signal device(s) may be part of, or the same as, network 102. In an embodiment, signal device(s) 120 may emit radiation pattern that is the range of the signal device(s) 120 communication ability.

In an embodiment, mobile device(s) 130 may be a laptop, tablet, or netbook personal computer (PC), a desktop computer, a personal digital assistant (PDA), a smart phone, camera, video camera, video device or any programmable electronic device capable of communicating with any computing device within data processing environment 100 via signal device(s) 120. In an embodiment, mobile device(s) 130 may be a smart watch or wearable device. In general, mobile device(s) 110 is representative of any electronic device or combination of electronic devices capable of executing computer readable program instructions. In an embodiment, there may be any number of mobile device(s) 130 in data processing environment 100. In an example, mobile device(s) may be a cell phone of a customer as the customer moves throughout a retail store. In another example, mobile device(s) may be a laptop of an employee as the employee moves throughout an office.

In an embodiment, location device(s) 140 may be a device capable of locating, within a physical area, any other computing device (e.g., signal device(s) 120, mobile device(s) 130, etc.) within data processing environment 100. In an embodiment, location device(s) 140 may be part of a Wi-Fi positioning system (WPS). In another embodiment, location device(s) 140 may be part of a global position system (GPS). In yet another embodiment, location device(s) 140 may be part of an indoor positioning system (IPS) capable of locating devices inside a physical area using any combination of radio waves, magnetic fields, acoustic signals, or any other sensory information collected from device (i.e., mobile device(s) 130). In an embodiment, there may be any number of location device(s) 140 in data processing environment 100.

Figure 2:
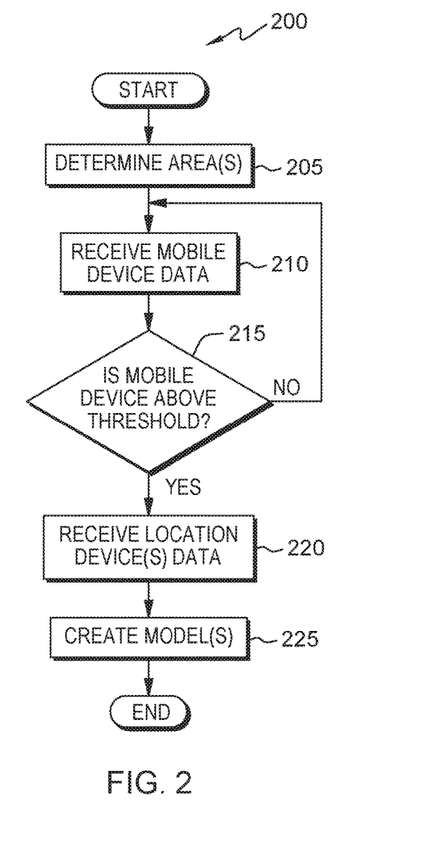
FIG. 2 depicts a flowchart of operational steps of a program for determining and modeling signal strength in a physical environment, in accordance with an embodiment of the present invention.

FIG. 2 is a flowchart of workflow 200 depicting operational steps for determining and modeling signal strength in a physical environment, in accordance with an embodiment of the present invention. In one embodiment, the steps of the workflow are performed by visual program 112. In an alternative embodiment, steps of the workflow can be performed by any other program while working with visual program 112. In an embodiment, a user, via a user interface discussed previously, can invoke workflow 200 upon a user wanting visual program 112 to determine signal strength in a physical environment. In an alternative embodiment, a user, via a user interface discussed previously, can invoke workflow 200 upon a user wanting visual program 112 to create a machine learning model for signal strength data.

Visual program 112 determines area(s) (step 205). In other words, visual program 112 determines a physical area (e.g., a floor plan) that may include one or more of a signal device(s) 120 and location device(s) 140. In an embodiment, visual program 112 may determine the area(s) from data found in information repository 114 (i.e., previously stored floor plans). In an alternative embodiment, visual program 112 may determine the area(s) via user input via the user interface, discussed previously. In an embodiment, the determined area(s) may include location information about physical items found in the area(s). For example, the locations of walls, tables, electronics, utilities, metal shelves, metal racks, iron reinforced structural pylons, or any other physical item. In an embodiment, visual program 122, when determining the area(s), may also receive information about the location of each signal device(s) 120 and location device(s) 140. In an embodiment, the location of each of the signal device(s) 120 and location device(s) 140 may include one or more of the following: an x-coordinate (a measure of distance along the x-axis), a y-coordinate (a measure of distance along the y-axis), and a z-coordinate (a measure of distance along the z-axis) data so as to the place the device(s) in all three dimensions in the physical area. In another embodiment, the location of the device may include one or more of the following: a longitude (x-coordinate), a latitude (y-coordinate) and an elevation (z-coordinate).

Visual program 112 receives mobile device data (step 210). In other words, visual program 112 receives data from a mobile device(s) 130 when the mobile device(s) 130 enters the determined area(s). In an embodiment, the data that is received from mobile device(s) 130 may include, but is not limited to, the type of device (i.e., brand, model, etc. of the device), the battery level of the device, a beacon identifier for the mobile device(s) 130, and the strength of signal that the mobile device(s) 130 is receiving from any or all of the signal devices(s) 120 found in the determined area(s). In an embodiment, the data may include the received signal strength indication (RSSI) values or the broadcasting power of the device.

Visual program 112 determines if the mobile device is above a threshold (decision block 215). In other words, visual program 112 determines if the strength of the signal that the mobile device(s) 130 is receiving from any or all of the signal device(s) 120 found in the determine area(s) is above a threshold. In an embodiment, the threshold may be a level of the signal strength that the mobile device(s) 130 can effectively communicate with the signal device(s) 120. For example, a mobile device may receive a signal of −100 dBm signal strength from a signal device, but the threshold is −80 dBm signal strength, and therefore, the signal strength does not go past the threshold. In an embodiment, visual program 112 may determine if the mobile device is above a threshold using RSSI. In this embodiment, RSSI is used to determine if the relative quality of the received signal is above a threshold. In an embodiment, visual program 112 may determine if the mobile device is above a threshold using dBm. In this embodiment, dBm is an absolute number representing power levels in milliwatts and visual program 112 may determine if the received signal strength on the mobile device in dBm is above a threshold dBm value.

In an embodiment, the threshold may be specific to each mobile device. In an alternative embodiment, the threshold may be for all mobile devices. In an embodiment, the threshold may be specific to the determined area (i.e., a commercial area may require a different threshold than an office area). In an embodiment, the threshold may be found in information repository 114. In an alternative embodiment, the user may indicate the threshold to visual program 112. In response to visual program 112 determining the strength of signal that the mobile device(s) 130 is receiving is below the threshold (decision block 215, no branch), visual program 112 receives mobile device data (step 210).

In response to visual program 112 determining the strength of signal that the mobile device(s) 130 is receiving is above the threshold (decision block 215, yes branch), visual program 112 receives location device(s) data (step 220). In other words, visual program 112 receives, from the location device(s) 140, the location of the mobile device(s) 130 at the time the mobile device(s) 130 receives a signal above the threshold from the signal device(s) 120. In an embodiment, the location information includes the location relative to the signal device(s) 120. In an embodiment, the location information includes x-coordinate, y-coordinate, and z-coordinate data, discussed previously, so as to locate the mobile device in all three dimensions in the physical area.

Visual program 112 creates model(s) (step 225). In an embodiment, visual program 112 create(s) models for each type of device in the previously determined physical area using the data received from mobile device(s) 130. In other words, visual program 112 may create a model for a first device that indicates the different maximum signal strengths of the first device based on the strength of signal received from the mobile device(s) 130 as a user, holding mobile device(s) 130, moves through the physical area. In an embodiment, visual program 112 creates models for physical items found in the physical area. In other words, visual program 112 may create a model for a physical item (e.g., a wooden wall) and the effect the physical item has on the signal strength of a device using the received signal strength from a mobile device(s) 130 as a user, holding mobile device(s) 130, moves through the physical area that includes the physical item. In an alternative embodiment, visual program 112 may create models using other data received from other devices (not shown) that are not in the determined physical area. In other words, visual program 112 may use historical data, alone, or along with the real time data received in step 210 to create the models for either the devices or physical items found in the physical area.

In an embodiment, visual program 112 may create a visual representation of the location information received from the location device(s) 140, received in step 220. In other words, visual program 112 may create a visual representation of the location of a mobile device(s) 130, when the mobile device(s) 130 received signal strength is above a threshold. In an embodiment, this visual representation may include one or more of the following: the location of the signal device(s) 120, any or all locations at which the mobile device(s) 130 receive a signal strength above a threshold, any physical items found in the determine area(s), discussed previously, and the broadcasting power of the signal device(s) 120. In an embodiment, the visual representation is in two dimensions. In an alternative embodiment, the visual representation is in three dimensions.

Figure 3:
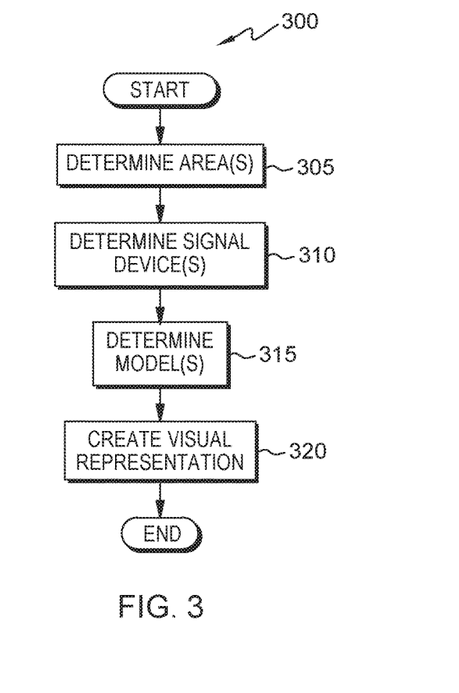
FIG. 3 depicts a flowchart of operational steps of a program for displaying signal strength in a physical environment, in accordance with an embodiment of the present invention.

FIG. 3 is a flowchart of workflow 300 depicting operational steps for displaying signal strength in a physical environment. In one embodiment, the steps of the workflow are performed by visual program 112. In an alternative embodiment, steps of the workflow can be performed by any other program while working with visual program 112. In an embodiment, a user, via a user interface discussed previously, can invoke workflow 300 upon a user wanting to create a visual representation of the strength of signal of a signal device in a physical area.

Visual program 112 determines area(s) (step 305). In other words, visual program 112 determines a physical area (e.g., a floor plan). In an embodiment, visual program 112 may determine the area(s) from data found in information repository 114 (i.e., previously stored floor plans). In an alternative embodiment, visual program 112 may determine the area(s) via user input via the user interface, discussed previously. In an embodiment, the determined area(s) may include location information about physical items found in the area(s). For example, the locations of walls, tables, electronics, utilities, metal shelves, metal racks, iron reinforced structural pylons, or any other physical item.

Visual program 112 determines signal device(s) (step 310). In other words, visual program 112 determines the signal device(s) 120 that are found in the area(s) determined in the previous step. In an embodiment, visual program 112 determines, via network 102, the location signal device(s) 120 and determines if signal device(s) 120 are located within the determined physical area and the location of the signal devices(s) 120 in the determined area. In an alternative embodiment, a user, via the user interface discussed previously, indicates the signal device(s) 120 that are found in the determined area and the location of the signal device(s) 120 in the determined area. In an example, visual program 112 determines there are two signal device(s) 120 (e.g., one router and one Bluetooth™ beacon.) in the determined area.

Visual program 112 determines a machine learning model(s) (step 315). In other words, visual program 112 determines at least one machine learning model based on the physical area determined previously and the determined signal device(s). In an embodiment, visual program 112 may determine a machine learning model for physical items found in the determined area. For example, there may be a machine learning model for tables that are found in the determined physical area, a machine learning model for metal rack in the determined physical area, and a machine learning model for iron reinforced structural pylons determined in the physical area. In an embodiment, visual program 112 may determine a machine learning mode for each signal device(s) 120 found in the determined area. For example, there may be a machine learning model specific to the determined router and the determined Bluetooth™ beacon.

Visual program 112 creates a visual representation (step 320). In other words, visual program 112 creates a visual representation of the signal device(s) 120 found in the determined area(s) and the modified signal strength of the signal device(s) using the machine learning models determined previously. In an embodiment, the visual representation is in two dimensions. In an alternative embodiment, the visual representation is in three dimensions. Example embodiments of visual representations are discussed below. In an embodiment, visual program 112 creates a visual representation of the modified signal strength of the signal device(s) and a user may able to modify/edit/move the modified signal strength via a "handle" so as to adjust modified signal strength to depict how the signal device(s) will react in a particular physical area or at a particular location.

FIG. 4A depict example visual representations of signal strength in a physical environment, in accordance with an embodiment of the present invention. In the example, FIG. 4A includes physical area 400 (i.e., an office environment). Further, the example includes a wireless router 420. Here, wireless router 420 has an expected signal strength 432. Expected signal strength 432 is shown by a circle with varying edges removed outside of physical area 400 that is the signal strength of the device in a hypothetical scenario based on the manufacture specifications of wireless router 420. Physical area 400 includes electronic devices 424A and electronic devices 424B, as shown in the internet technology (IT) office, and electronic devices 424A and electronic devices 424B may be typical electronic devices, such as, but not limited to, a server, a printer, a computer, or any other electronic devices that may be found in an IT office. Physical area 400 includes wall 426A. Here, wall 426A may be a load bearing metal wall that provides physical support to the physical area 400 ceiling. Here, wall 428B may be a wall iron reinforced structural pylons that provides physical support to the physical area 400 ceiling. Physical area 400 may include any number of walls, infrastructure, etc., that are not shown. As a user, that has an electronic device (e.g., a cell phone) moves through physical area, the actual signal strength 434 is shown. The actual signal strength 434 is the strength at which the electronic device of the user receives signal strength from the wireless router 420 above a threshold. As can be seen in FIG. 4B, the actual signal strength 434 is not identical to the expected signal strength 432. The actual signal strength 434 is affected by electronic devices 424A and electronic devices 424B along with wall 426A and wall 428B. Actual signal strength 434 is used by visual program 112 to create models of signal strength for wireless router 420. Additionally, the actual signal strength 434 is used by visual program 112 to create models of how electronic devices 424A, electronic devices 424B, wall 426A, and wall 428B effect the strength of signals in physical area 400. In an embodiment, the actual signal strength 434 may be the same as the expected signal strength 432 if there is no interference from physical items. In another embodiment, the actual signal strength 434 may be less strong than the expected signal strength 432 if there is no interference from physical items.

FIG. 4B depict example visual representations of signal strength in a physical environment, in accordance with an embodiment of the present invention. In the example, FIG. 4B includes physical area 450 (i.e., a retail environment). Further, the example includes Bluetooth™ beacon 470A and Bluetooth™ beacon 470B. Here, Bluetooth™ beacon 470A has expected signal strength 492A and Bluetooth™ beacon 470B has expected signal strength 492B. Expected signal strength 492A and expected signal strength 492B is shown by a circle with varying edges removed outside of physical area 450 that is the signal strength of the device in a hypothetical scenario based on the manufacture specifications of Bluetooth™ beacon 470A and Bluetooth™ beacon 470B. A user may place a Bluetooth™ beacon (i.e. Bluetooth™ beacon 470A and Bluetooth™ beacon 470B) in physical area 450 to determine their projected signal strength. Here, the projected signal strength of a device is the strength at which the electronic device of a user receives signal strength from the Bluetooth™ beacon 470A or Bluetooth™ beacon 470B above a threshold as the user moves through physical area 450. The projected signal strength is created using machine learning models, discussed previously.

Here, Bluetooth™ beacon 470A has a projected signal strength 494A that is modified by wall 478, structure 472, structure 474, and structure 476. Wall 478 is a wall iron reinforced structural pylons that provides physical support to the physical area 400 ceiling and the machine learning model associated with wall 478 indicates an effect in signal strength as shown by the "dead zone" of no signal strength on the side of the wall farther away from Bluetooth™ beacon 470A and the projected signal strength 494A that is different than the expected signal strength 492A near and around wall 478. Structure 476 has a machine learning model that indicates no effects to the signal strength of Bluetooth™ beacon 470A. Structure 472 and structure 474 have machine learning models that indicate effects in signal strength of Bluetooth™ beacon 470A as shown by the projected signal strength 494A that is different than the expected signal strength 492A near and around structure 472 and structure 474. Table 482 has a machine learning model that indicates no effect on signal strength of Bluetooth™ beacon 470A.

Here, Bluetooth™ beacon 470B has a projected signal strength 494B that is modified by wall 480, structure 472, structure 474, and structure 476. Wall 480 is a wooden wall that provides no physical support to the physical area 400 ceiling and the machine learning model associated with wall 480 indicates no effect in signal strength on the side of the wall farther away from Bluetooth™ beacon 470B and the projected signal strength 494B is not different than the expected signal strength 492B near and around wall 480. Structure 476 has a machine learning model that indicates no effects to the signal strength of Bluetooth™ beacon 470B. Structure 472 and structure 474 have machine learning models that indicate effects in signal strength of Bluetooth™ beacon 470B as shown by the projected signal strength 494B that is different than the expected signal strength 492B near and around structure 472 and structure 474. Table 482 has a machine learning model that indicates no effect on signal strength of Bluetooth™ beacon 470B. In an embodiment, the projected signal strength 494A and projected signal strength 494B may be the same as the expected signal strength 492A and expected signal strength 492B, respectively, if there is no interference from physical items. In another embodiment, the projected signal strength 494A and projected signal strength 494B may be less strong than the expected signal strength 492A and expected signal strength 492B, respectively, if there is no interference from physical items.

Figure 5:
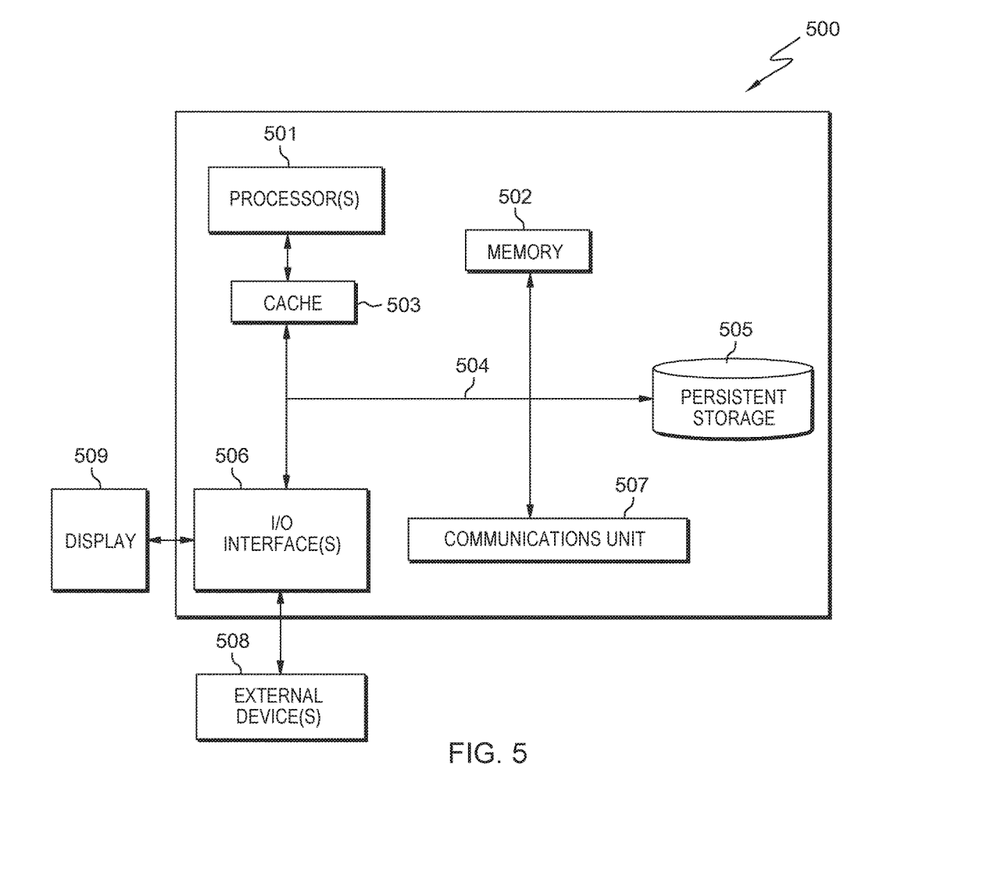
FIG. 5 depicts a block diagram of components of the computer of FIG. 1, in accordance with an embodiment of the present invention.

FIG. 5 depicts computer system 500, which is an example of a system that includes visual program 112. Computer system 500 includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer system for determining, modeling, and displaying signal strength in a physical environment, the computer system comprising:

one or more computer processors;

one or more computer readable storage media; and program instructions, stored on the one or more computer readable storage media for execution by at least one of the one or more computer processors, the program instructions comprising:

program instructions to receive information about a signal device at a first location in a first physical environment, wherein the signal device broadcasts a signal to a computing device, and wherein the information about the signal device includes a battery power of the signal device;

program instructions to receive a first indication from the computing device, wherein the first indication includes a first strength of signal of the signal device received by the computing device;

program instructions, responsive to receiving the first indication from the computing device, to determine whether the first strength of signal is above a threshold, wherein the threshold is received from a user;

program instructions, responsive to determining the first strength of signal is above the threshold, to determine a second location, wherein the second location is where the computing device is located when the first strength of signal is above the threshold, and wherein the second location is within the first physical environment;

program instructions to determine one or more physical items found in the first physical environment;

program instructions to display a first visual representation of the first physical environment, wherein the first visual representation is displayed in two dimensions, and wherein the first visual representation includes all of the following: the signal device at the first location, the one or more physical items found in the first physical environment, a broadcasting power of the signal device, and the second location;

program instructions to create a machine learning model for the signal device using the first location, the second location, the battery power of the signal device, and the one or more physical items found in the first physical environment, wherein the machine learning model is a model of actual signal strength of the signal device;

program instructions to receive a second indication from the computing device, wherein the second indication includes a second strength of signal of the signal device received by the computing device;

program instructions, responsive to receiving the second indication from the computing device, to determine whether the second strength of signal is above the threshold;

program instructions, responsive to determining the second strength of signal is above the threshold, to determine a third location, wherein the third location is where the computing device is located when the second strength of signal is above the threshold, and wherein the third location is within the first physical environment;

program instructions, responsive to determining the third location, to update the machine learning model for the signal device using the first location, the third location, and the one or more physical items found in the first physical environment;

program instructions to receive a user indication to create a second visual representation, wherein the second visual representation is displayed in three dimensions, and wherein the user indication includes a second physical environment, one or more signal devices found in the second physical environment, the battery power of each signal device of the one or more signal devices, and at least one physical item found in the second physical environment;

program instructions to create the second visual representation using the second visual environment, the at least one physical item found in the second physical environment, the battery power of each signal device of the one or more signal devices, and a machine learning model associated with the one or more signal devices found in the second physical environment; and program instructions to display the second visual representation, wherein the second visual representation displays the second physical environment, the at least one physical item found in the second physical environment, and a broadcasting power for each signal device of the one or more signal devices found in the second physical environment based on the machine learning model associated with the one or more signal devices found in the second physical environment.

\* \* \* \* \*